Figure 1:
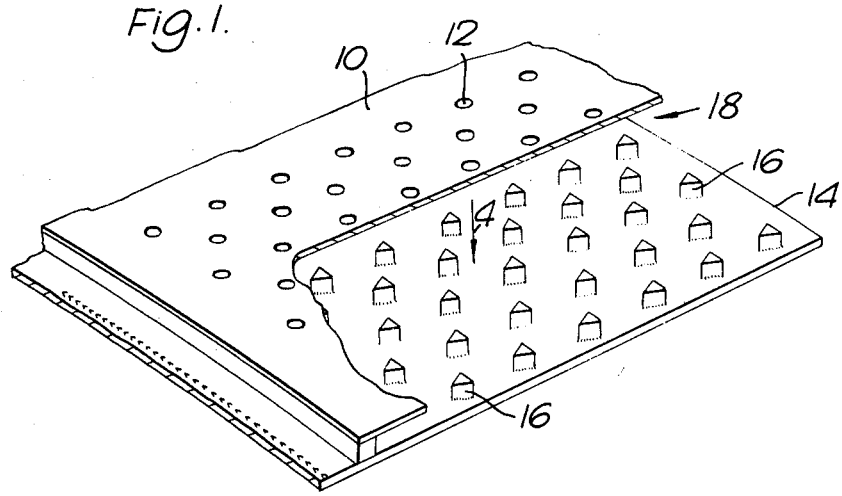

United States Patent [19]
Bhangu

[11] 4,064,300
[45] Dec. 20, 1977

[54] LAMINATED MATERIALS

[75] Inventor: Jagnandan Kumar Bhangu, Ockbrook, England

[73] Assignee: Rolls-Royce Limited, London, England

[21] Appl. No.: 703,248

[22] Filed: July 7, 1976

[30] Foreign Application Priority Data

July 16, 1975 United Kingdom ............... 29786/75

[51] Int. Cl.² ............................ F28F 3/04; F28F 3/14; F02C 7/18
[52] U.S. Cl. ................................... 428/120; 428/129; 428/138; 60/39.66; 431/352
[58] Field of Search ...................... 428/129, 138, 120; 60/39.66; 415/115, 116; 416/97 A, 97 R, 229 A; 431/351, 352

[56] References Cited
U.S. PATENT DOCUMENTS

| 2,657,531 | 11/1953 | Pierce | 60/39.66 |
| 2,919,549 | 1/1960 | Haworth et al. | 60/39.66 |
| 3,584,972 | 6/1971 | Bratkovich et al. | 416/229 |
| 3,620,643 | 11/1971 | Jones | 416/97 A |
| 3,806,276 | 4/1974 | Aspinwall | 416/97 |
| 3,864,199 | 2/1975 | Meginnis | 416/97 |

FOREIGN PATENT DOCUMENTS 2,555,814  12/1975  Germany.

*Primary Examiner*—Robert E. Garrett
*Attorney, Agent, or Firm*—Cushman, Darby & Cushman

[57] ABSTRACT

Laminated material comprises two spaced sheets, one having perforations and one being plain, the sheets being connected by heat conductive portions. Cooling fluid is passed through the perforations, impinges on the plain sheet and then passes between the sheets to discharge from the end of the laminate.

7 Claims, 7 Drawing Figures

LAMINATED MATERIALS

This invention relates to laminated materials which are particularly suitable for use in high temperature parts of gas turbine engines, although the invention is not restricted thereto.

To improve the thrust and fuel consumption of gas turbine engines i.e. the thermal efficiency, it is necessary to use higher compressor pressures and higher combustion temperatures. Higher compressor pressures give rise to higher compressor outlet temperatures and higher pressures in the combustion equipment resulting in significantly increased temperatures being reached by the flame tube walls. It is thus necessary to form the flame tube walls from a material which will withstand these increased temperatures and it is an object of the present invention to provide a material capable of withstanding temperatures of a higher value than those normally reached in the combustion equipment of a gas turbine engine.

According to the present invention laminated material comprises two spaced sheets, one of the sheets being provided with a plurality of spaced perforations, the two sheets being connected by a plurality of heat conductive portions which abut the perforated sheet between the perforations, whereby when a cooling fluid passes through the perforations, the fluid is directed between the two sheets and discharged therefrom downstream of the perforations and heat conductive portions.

The heat conductive portions may be formed integrally with the perforated sheet or the other sheet or alternatively may be formed separately and bonded to the two sheets.

The heat conductive portions preferably have a total cross-sectional area in the plane of the laminated material of from substantially 30 to 60% of the cross-sectional area of the laminated material per unit area.

Preferably there is one heat conductive portion adjacent to each perforation in the perforated sheet.

The perforations may have any suitable shape, but are preferably circular holes.

Preferably the holes are arranged symmetrically, there being provided a heat conductive portion between adjacent holes.

The heat conductive portions are preferably shaped to form a series of shaped passageways extending between the two sheets, which passageways are adapted to direct a cooling fluid entering the perforations along the length of the laminate between the two sheets.

The invention also comprises combustion equipment for a gas turbine engine constructed using laminated material as set forth above.

Figure 2:
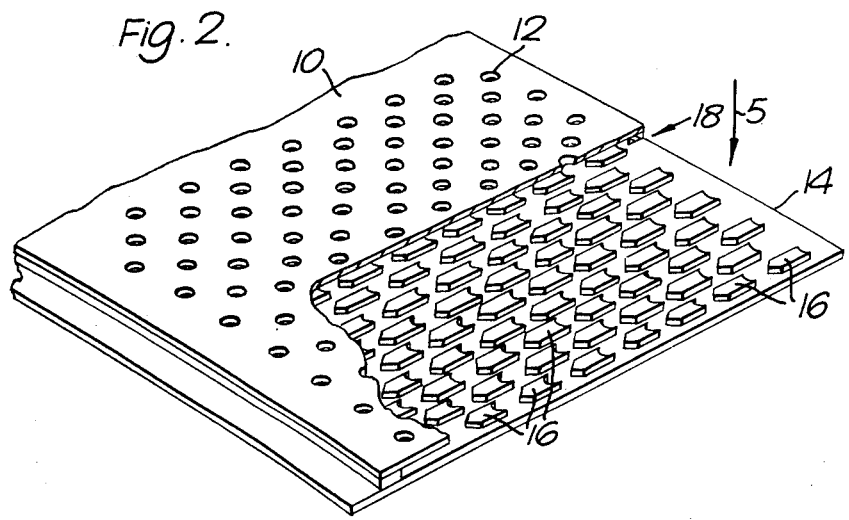
Figure 3:
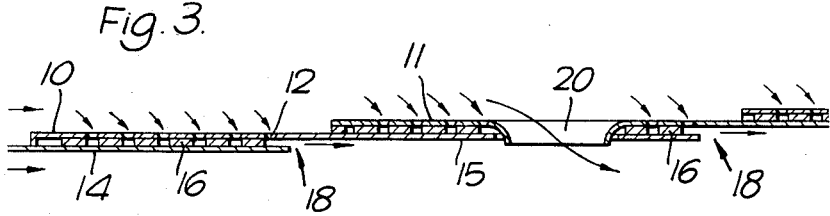
Figure 4:
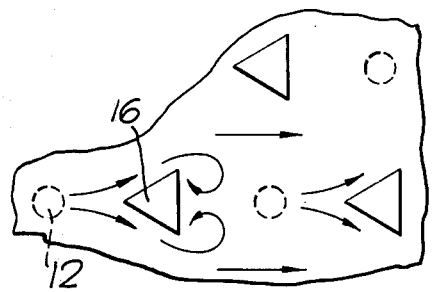
Figure 5:
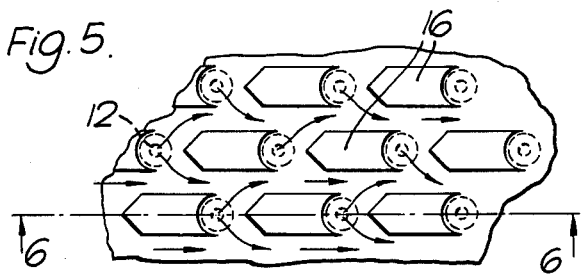
Figure 6:
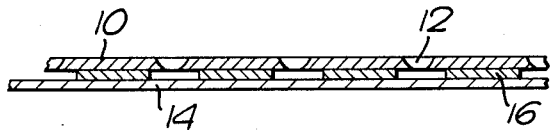
Figure 7:
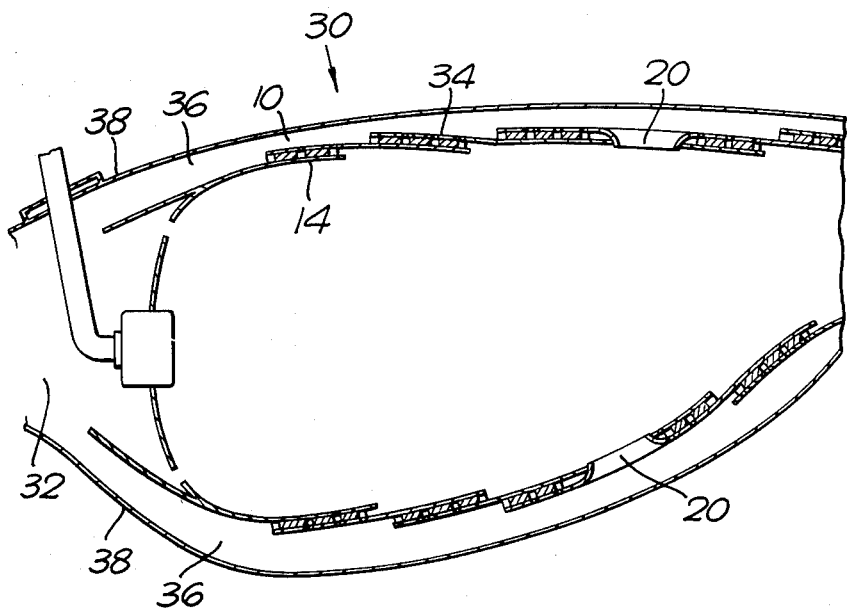

Embodiments of the invention will now be described by way of example only with reference to the accompanying drawings in which:

FIG. 1 is a cutaway view of laminated material constructed in accordance with the invention, FIG. 2 is a cutaway view of an alternative form of laminated material, FIG. 3 is a cross-sectional view of part of a combustion chamber for a gas turbine engine constructed from laminated material in accordance with the invention, FIG. 4 is a view on FIG. 1 from arrow 4, FIG. 5 is a view on FIG. 2 from arrow 5, FIG. 6 is a cross-sectional view taken along line 6—6 on FIG. 5, and FIG. 7 is a cross-sectional view of a combustion chamber for a gas turbine engine constructed using the laminated material according to the invention.

Laminated material shown in FIG. 1 consists of a first sheet 10 provided with a plurality of holes 12 and a second sheet 14 spaced from the first sheet by a plurality of heat conductive lands 16.

The holes 12 and the lands 16 are symmetrically arranged and out of alignment such that the holes 12 communicate with the spaces between the lands 16. The holes 12 are conveniently formed by electrochemical machining and the lands may be formed separately and brazed or bonded by vacuum diffusion to the sheets 10 and 14. Alternatively the lands 16 can be formed integrally with either of the sheets 10 or 14 together with the holes 12 by electrochemical machining and then brazed or bonded to the second sheet which in this case would be a plain sheet. No problems would then arise with aligning the sheets.

A land 16 is located adjacent to each hole 12, each land having a triangular cross-sectional shape, see FIG. 4.

It is intended that the sheet 14 is used as a flame tube wall and be located adjacent a hot zone such as the combustion gases in the combustion chamber of a gas turbine engine and the sheet 10 supplied with cooling air. The cooling air then passes through the holes 12 and impinges on the surface of the sheet 14 thus cooling the sheet 14. The cooling air then passes between the two sheets in the direction of the arrows shown in FIG. 4, and the shape of the lands is such that the air flow does not disturb the flow of air through the adjacent holes 12. Since the lands 16 are heat conductive, further heat is removed from the laminated material by the flow of cooling air past the sheet 10 and past the sides of the lands which may have sharp edges which act as boundary layer traps. The cooling air finally exhausts through a suitable space 18 at the end of the laminate.

The lands thus fulfill several functions: they maintain the space between the sheets 10 and 14 whilst permitting the laminate to be shaped or formed into a particular desired shape and also prevent the gap from being closed when the laminate is hot; they prevent disturbance of cooling air jets impinging on the second sheet 14 from the spent cross flow and they conduct heat from the hot sheet 14 to the cool sheet 10, thus tending to equalize the temperatures of the sheets 10 and 14. This results in two advantages; firstly the rate of cooling is increased because the cooling air both over the surface of the sheet 10 and in the gap between the sheets 10 and 14 now flows past the comparatively hot sheet 10. In the absence of the heat conductive lands 16 the sheet 10 would be nearer to the cooling air temperature. Secondly, the reduced temperature differential between sheets 10 and 14 reduces the possibility of distortion of the laminated material by differential thermal expansion.

FIG. 2 illustrates a preferred embodiment of the invention. In this case the lands 16 are larger in cross-sectional area in the plane of the material and are of an improved shape to prevent interference between the jets of air passing through the holes 12. The lands in fact form a series of shaped passageways therebetween (see FIG. 5) which direct the cooling air along the length of the laminated material between the sheets. It has been found that the lands are most effective if they cover from substantially 30% to 60% of the surface area of the sheets.

FIG. 3 is a cross-sectional area of a portion of a flame tube of a gas turbine engine combustion chamber constructed from the laminated material. The wall consists of a laminated material according to the invention, the cool sheet 10 of the first portion of the wall becoming or being joined to the hot sheet 15 of the adjacent downstream portion of laminated material. By this arrangement, the cooling air issuing from the space 18 is utilized to form a film of cooling air along the hot side of the sheet 15 of the laminated material. Dilution air holes such as the hole 20 can be provided through the laminated material as are provided in flame tubes constructed from conventional materials.

It will be appreciated that the laminated material is suitable for many components which must withstand high temperatures and can readily by supplied with cooling air. The sheets 10 and 14 can be formed from any suitable high temperature material, such as nickel alloy.

FIG. 7 illustrates a cross-sectional view of a complete gas turbine engine combustion chamber 30 having a flame tube 34 constructed in the same manner as shown in FIG. 3. Compressed air is supplied to the chamber 30 from a compressor (not shown) along a duct 32 which may be annular or tubular. Some of the air passes into the flame tube 34 and some passes into the space 36 between the flame tube 34 and the outer casing 38 of the combustion chamber. The former air is used for combustion inside the flame tube, whilst the latter is used for cooling the walls of the flame tube 34 and for dilution air which passes through the holes 20 into the flame tube 34.

I claim:

1. A laminated material adapted to be subjected to a flow of relatively cool fluid across one of its outer surfaces and to a flow of hot fluid across the other of its outer surfaces, said laminated material comprising: two sheets spaced apart to define an area for the flow of a cooling fluid there-between in generally the same direction as the flow of the hot and cool fluids across the outer surfaces of the laminated material, one of said sheets which is subjected to the cool fluid across its outer surface having a plurality of spaced perforations so that portions of the cooling fluid flowing across its outer surface can enter into the area between said sheets and flow therebetween in the same general single predetermined direction as the hot and cool fluids flowing across the outer surfaces of the laminated material and the other of said sheets being imperforate to the flow of fluid, a plurality of heat conductive portions connecting said two sheets and abutting said sheets between the perforations in a downstream direction of the perforations, said heat conductive portions being shaped to deflect cooling fluid entering the area between the sheets through any of said perforations into said general single predetermined direction and said conductive portions being further positioned in front of perforations to guide cooling fluid flowing between said sheets away therefrom whereby cooling fluid entering therethrough between said sheets is undisturbed by cooling fluid entering previously through other perforations.

2. Laminated material as claimed in claim 1 in which said heat conductive portions are formed integrally with one of said sheets.

3. Laminated material as claimed in claim 1 in which said heat conductive portions have a total cross-sectional area in the plane of the laminated material of from substantially 30% to 60% of the laminated material per unit area.

4. Laminated material as claimed in claim 1 in which there is one said heat conductive portion adjacent to each said perforation in said perforated sheet.

5. Laminated material as claimed in claim 1 in which said perforations comprise circular holes.

6. Laminated material as claimed in claim 5 in which said holes are arranged symmetrically, there being provided one said heat conductive portion between adjacent holes in a downstream direction of the holes.

7. Laminated material as claimed in claim 6 having a plurality of shaped passageways, said heat conductive portions being shaped to form said plurality of shaped passageways between said two sheets, said passageways being adapted to direct the cooling fluid entering said perforations along the length of the laminated material between said two sheets.

* * * * *